Patented May 3, 1932

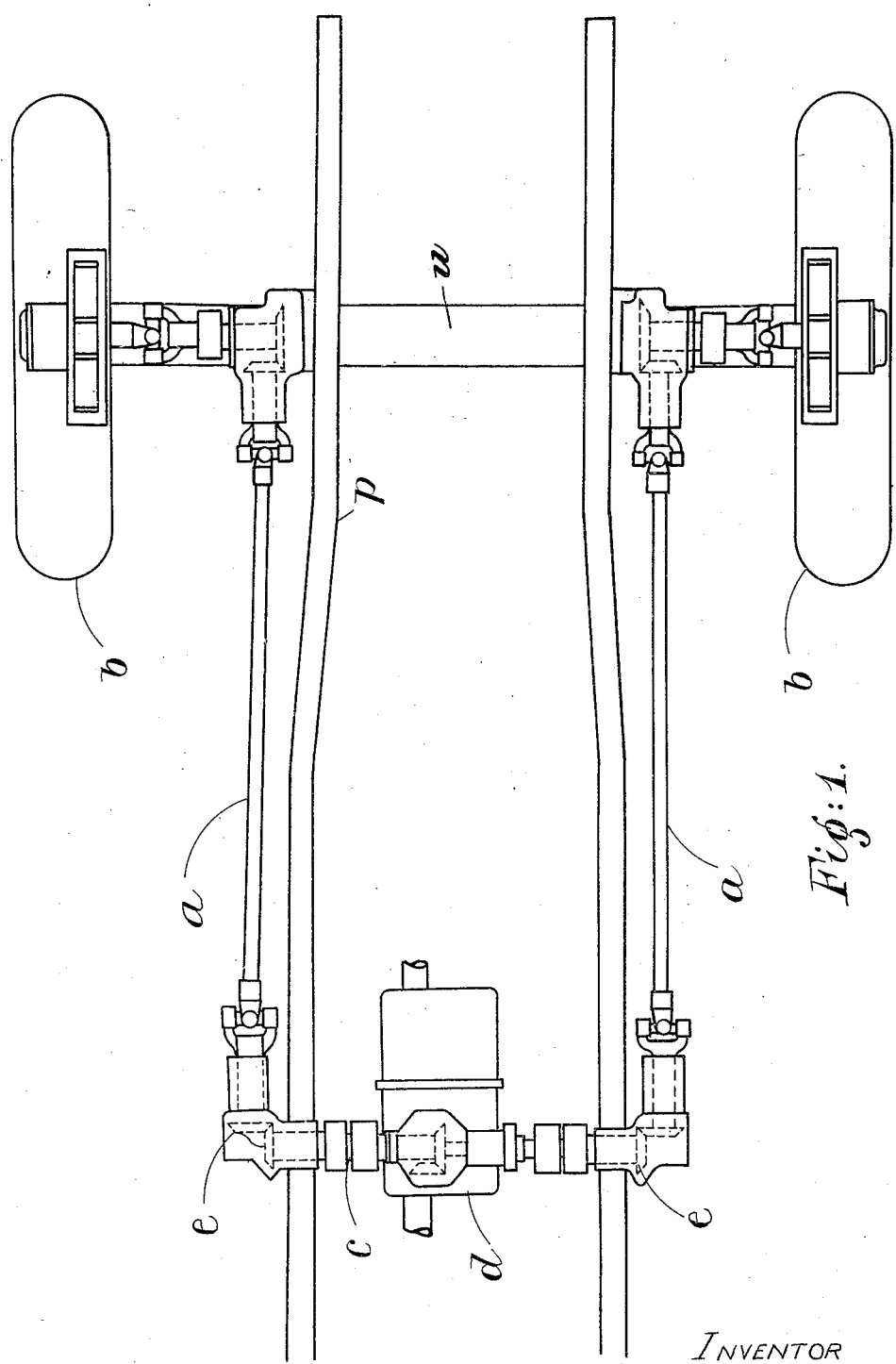

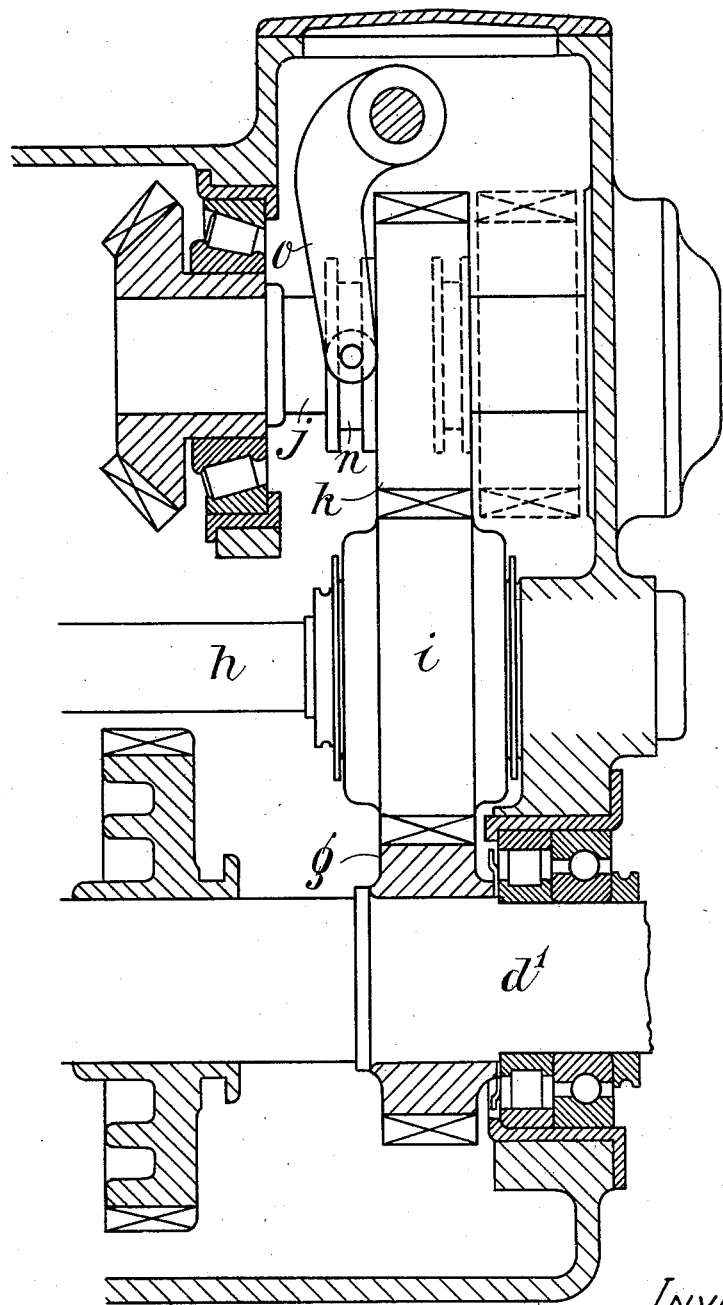
Fig: 2

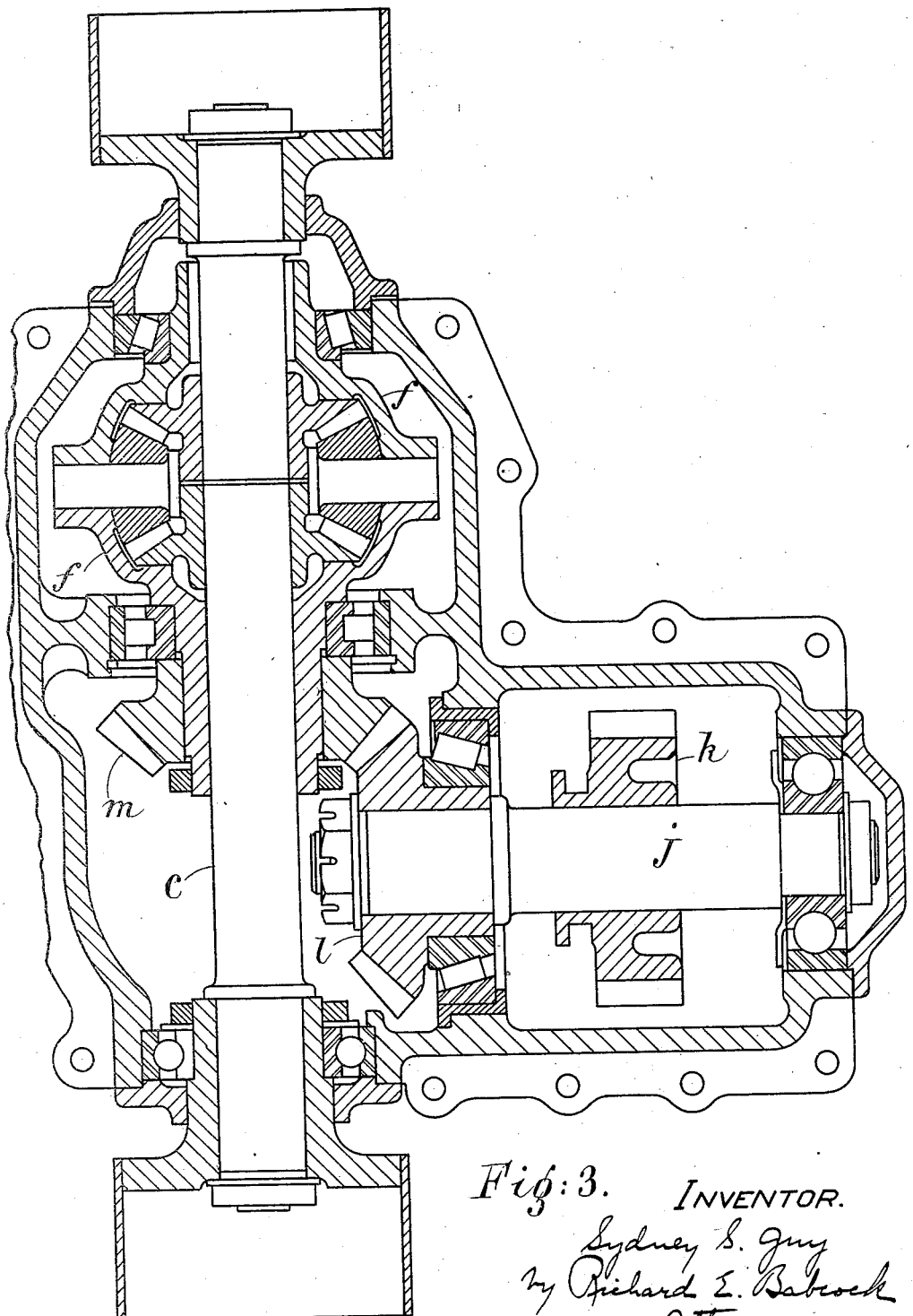
Fig:3.

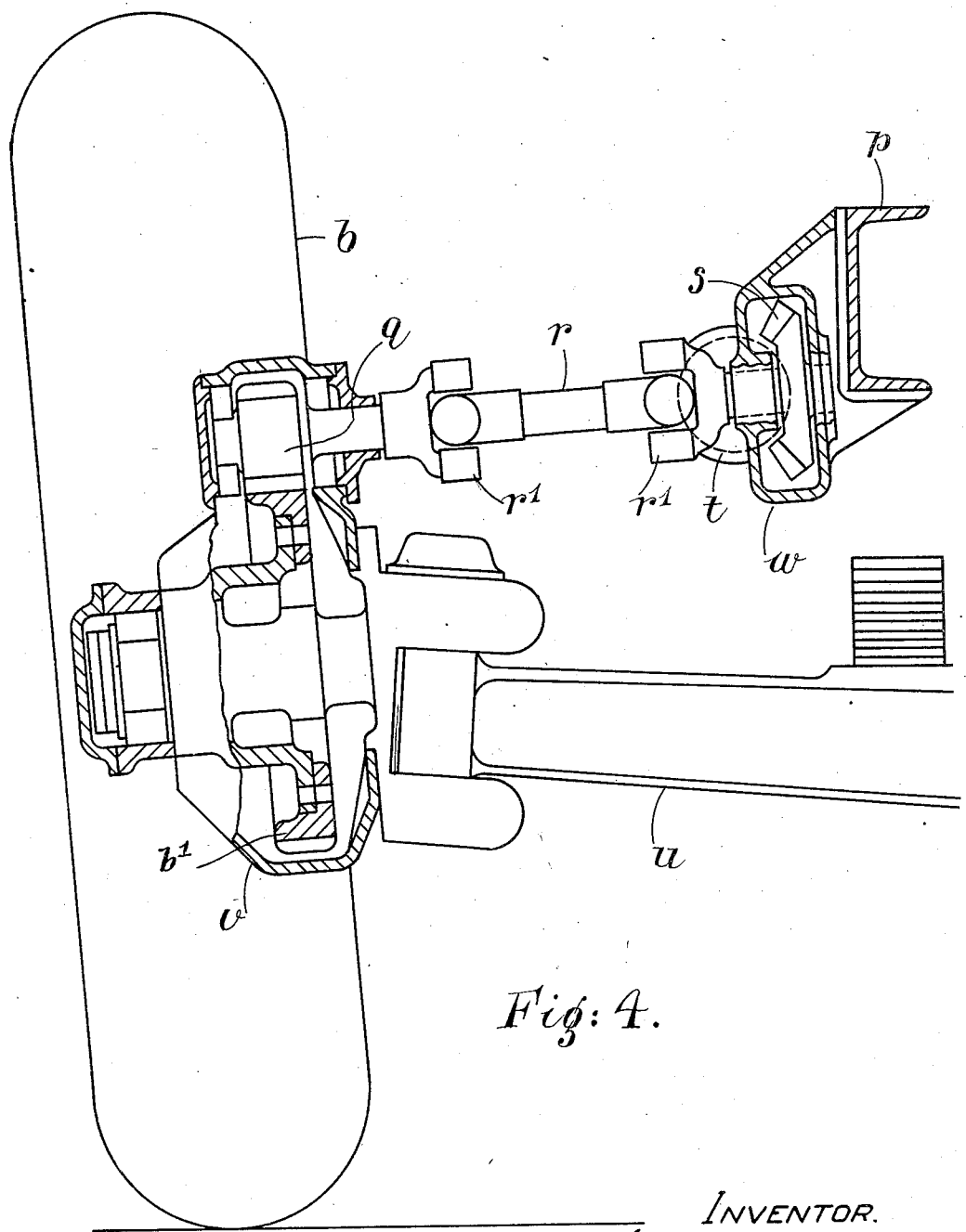
Fig: 4.

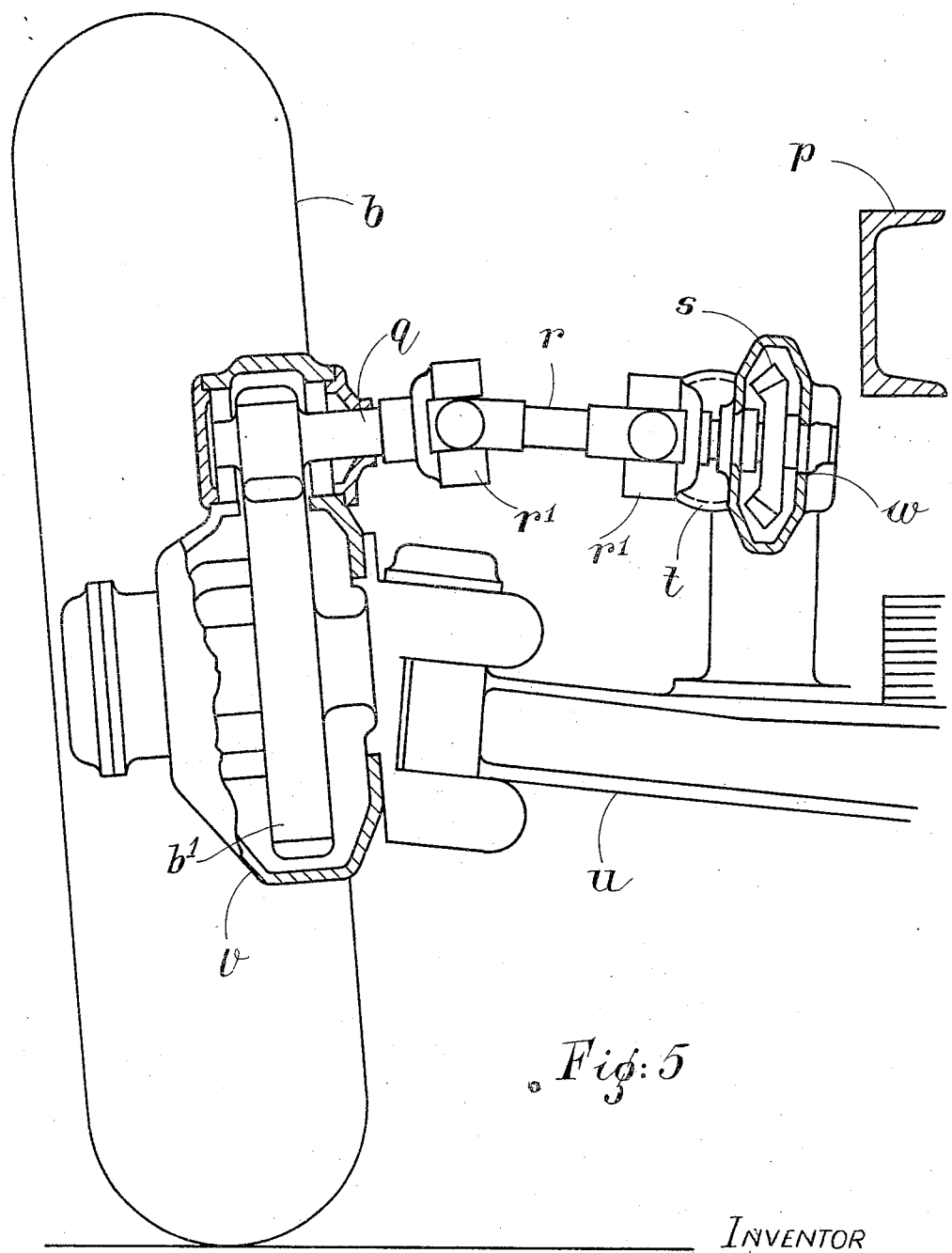
Fig:5

1,856,831

UNITED STATES PATENT OFFICE

SYDNEY SLATER GUY, OF WOLVERHAMPTON, ENGLAND

FRONT WHEEL DRIVE SYSTEM FOR MOTOR VEHICLES

Application filed December 21, 1929, Serial No. 415,705, and in Great Britain December 24, 1928.

This invention relates to front wheel drive systems for motor vehicles and more particularly to the type of drive in which each front wheel is driven by means of a longitudinal shaft running alongside the main frame from the ends of a transverse shaft operated from a variable speed gear driven by the motor.

The present invention has particular reference to the manner in which the transverse shaft receives its motion from the variable speed gear, and to the manner in which the drive is transmitted from the longitudinal shafts to the front steering road wheels.

The invention involves the provision within the ordinary gear box or in a gear box auxiliary thereto of a gear member which takes the final drive at all speeds. The transverse shaft is driven from this gear member in any suitable manner as by means of spur or bevel gear and provision may be made whereby the drive between the transverse shaft and said gear member may be disconnected at will.

The drive from the front end of the longitudinal shaft at each side of the vehicle is taken through bevel or worm gear, mounted either upon the main frame or upon the front axle and thence through a short universally jointed outwardly directed shaft to spur or skew gear attached to the front wheel hub.

In the accompanying drawings,

Figure 1 is a plan view showing the general arrangement of the front wheel drive system.

Figure 2 is a sectional view on a larger scale showing the manner in which the transverse shaft derives its motion from the variable speed gear.

Figure 3 is a sectional plan view of the same.

Figure 4 shows a sectional front view of a front wheel drive in which the driving gear is supported off the frame of the vehicle.

Figure 5 is a similar view in which the drive is supported off the axle.

Throughout the drawings like parts are designated by similar reference characters.

Referring to the general arrangement shown in Figure 1, $a$, $a$ represent the longitudinal side shafts which drive the front wheels $b$, $b$; $c$, indicates the transverse shaft and $d$ the gear box. The transmission of power from the transverse shaft to the longitudinal shafts may be by bevel gear $e$, $e$ off each end of the former.

According to the arrangement shown in Figures 2 and 3, the main shaft $d^1$ of an otherwise orthodox variable speed gear $d$ of the sliding gear type is extended at one end to carry an extra gear wheel $g$ which takes the final drive at all speeds. It is from this wheel $g$ that the transverse shaft $c$ derives its motion, the transmission of the drive taking place through two intermediate shafts, one $h$ of which carries an idle gear wheel $i$, whilst the other shaft $j$ carries a gear wheel $k$ and also a bevel wheel $l$ in constant mesh with a bevel wheel $m$, Figure 3, on the transverse shaft $c$.

The front wheel drive may be used as an emergency drive for rear driven vehicles in which case some provision is necessary for throwing the front wheel drive into and out of commission as and when required. One way of carrying this into practical effect is shown in Figure 2, where it will be seen that the gear wheel $k$ is slidably mounted on feathers on its shaft into and out of operative driven connection with the idle gear member $i$ on the shaft $h$. For this purpose the said gear member $k$ may carry a grooved extension $n$ adapted to receive a striking fork $o$ adapted for operation by the driver in any suitable manner.

The whole of the gear is enclosed in a casing which may conveniently form part of the casing of the variable speed gear $d$. The transverse shaft may be arranged, as represented in Figure 1, above the gear box in suitable bearings carried by the main frame p and may be divided transversely and the two parts connected together by the differential gear f as shown in Figure 3.

For the purpose of transmitting the drive from the forward ends of the longitudinal shafts a, a to each front wheel b the latter, as shown in Figures 4 and 5, is provided with a gear member $b^1$ which is in constant mesh with a driving pinion q fixed to the outer end of a short universally jointed transverse shaft r, the inner end of which carries a bevel wheel s in driven relationship with a bevel wheel t on the forward end of the adjacent longitudinal shaft a. Worm gear may be substituted for the bevel gear s, t if desired.

Where, as shown in Figure 4 the bevel or worm gear aforesaid is carried by the main frame p the universal joint or joints $r^1$ in the transverse shaft r allow both for the deflection of the wheel in steering and also for the rise and fall of the wheels when passing over uneven surfaces.

In the alternative case where, as shown in Figure 5, the bevel or worm gear s, t is mounted upon the front axle u, the said universal joint or joints $r^1$ of the shaft r remain at a constant angle when the wheel rises and falls, the angle being altered only when the vehicle is cornering. The said universal joints, or, as shown, one of them may in either case be located on the steering axis.

The spur or skew gear $b^1$ q at the wheel hub can be enclosed in a dust and oil-tight casing v adapted to contain a supply of lubricant.

In certain cases, as where the bevel or worm drive s, t at the front end of the longitudinal shafts is carried off the main frame p, Figure 4, it may be necessary to off-set the front axle in plan to allow it to rise and fall without fouling the casing w containing the said drive.

I claim:

1. In motor vehicle driving mechanism in which each propelling wheel is driven by means of a longitudinal shaft running alongside the main frame from the ends of a transverse shaft operated from a motor driven variable speed gear, the interposition between said transverse shaft and variable speed gear of a disconnectible drive comprising a shaft arranged at right angles to and in constant driving connection with the transverse shaft, a pinion slidably arranged on said right angle shaft and adapted to rotate therewith, and means for moving said pinion into and out of driving connection with said variable speed gear.

2. In front driven motor vehicles in which each front wheel is driven by means of a longitudinal shaft running alongside the main frame from the ends of a transverse shaft operated by a motor driven variable speed gear, the combination with the forward end of each longitudinal shaft of a universally-jointed lateral shaft the inner end of which carries a gear member in constant mesh with a gear member on the forward end of the longitudinal shaft whilst its outer end carries a pinion gearing with a spur wheel fixed to the front wheel.

In testimony whereof, I have signed my name to this specification at Wolverhampton, this 19th day of November, 1929.

SYDNEY SLATER GUY.